March 24, 1931.  J. D. SARTAKOFF  1,797,591
BATTERY OF VALVES
Filed May 23, 1927
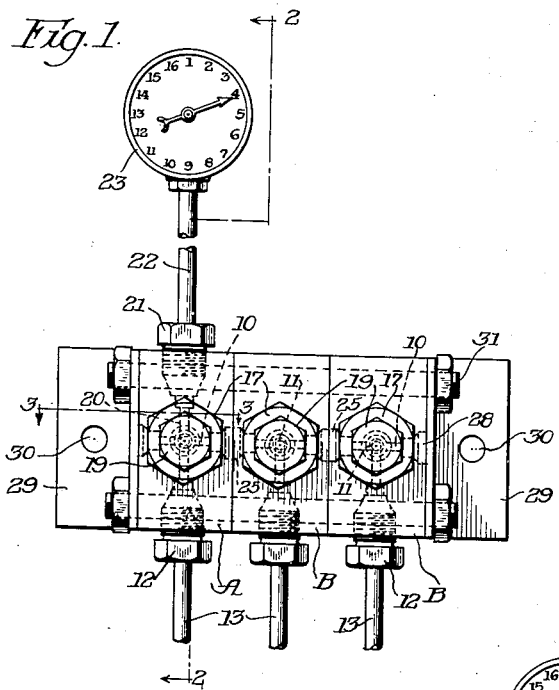
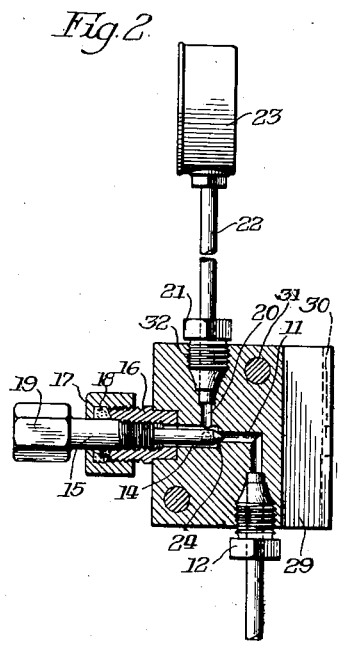
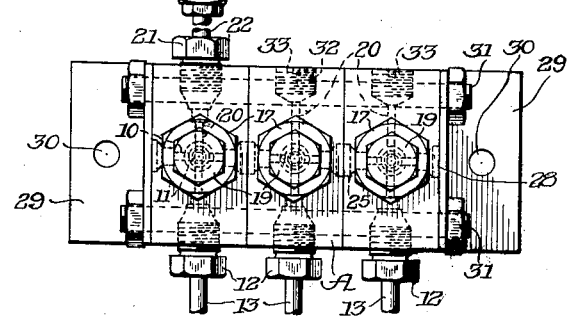
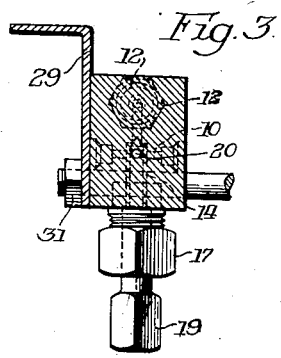
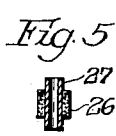
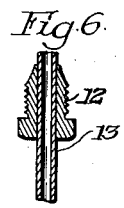
Inventor:
Jack D. Sartakoff.
By Wilkinson, Huxley, Byron & Knight
Attys.

Patented Mar. 24, 1931

1,797,591

UNITED STATES PATENT OFFICE

JACK D. SARTAKOFF, OF NEW YORK, N. Y., ASSIGNOR, BY MESNE ASSIGNMENTS, TO THE WAYNE PUMP COMPANY, OF BALTIMORE, MARYLAND, A CORPORATION OF MARYLAND

BATTERY OF VALVES

Application filed May 23, 1927. Serial No. 193,710.

The invention pertains to a series of interconnected valves, and particularly to a battery of valves connected to and controlling a series of receptacles whereby the pressures, and therefore the quantity of fluid, of said receptacles may be successively determined on a single measuring device.

In assembled valves of the usual type, it has been the practice to provide separate fastening means between adjacent valves and to provide some sort of flexible or resilient means for maintaining the valves in seated position; or in communicating valves of the usual type where it is contemplated that a gauge is to be used to measure pressure or output from a series of connected tanks, the gauge has merely been attached to the valve through a valve controlled opening. These valves are objectionable in that they have a number of parts to control and to assemble, which parts are liable to failure, are expensive to maintain and are not adapted to have interchangeable parts.

It is therefore an object of the invention to provide a plurality of similar valves adapted to be assembled so that the pressure through any valve may be read on a single measuring device.

Another object is to provide valve blocks of such character that they are simple and positive in design and operation and inexpensive to make and maintain.

A further object is to provide valve blocks of such character that they may be readily assembled by a minimum of holding or fastening means to thereby provide a means to cooperate with any number of tanks and adapted especially to measure the pressure or quantity of liquid in said tanks.

A different object is to provide a battery of valves connected to a single measuring means and to a plurality of distant tanks to thereby make possible the pressure reading of any tank or tanks.

Various other and more specific objects will be apparent from the specification and drawings appended hereto.

In the drawings, wherein like reference characters are used to designate like parts—

Figure 1 is an elevation of the battery of valves, showing the connection between a plurality of tanks and a single measuring device;

Figure 2 is a sectional side elevation of the device shown in Figure 1, taken substantially on the line 2—2 of said figure;

Figure 3 is a sectional plan of a portion of the device, taken substantially on the line 3—3 of Figure 1;

Figure 4 is a modification of the device shown in Figure 1, wherein valve blocks of the same character are used throughout the assembly;

Figure 5 is a detail of the connection of the passages between the valve blocks; and Figure 6 is a sectional detail of a bushing connection between an inlet or outlet pipe and the valve block.

It has oftentimes been found desirable to be able to read the pressure of a number of distant tanks on a single device located in a particular spot, as in a factory office, and for this purpose, referring particularly to Figure 1, there has been devised two kinds of valve blocks, A and B, which are adapted to be assembled and connected to a plurality of tanks and to a single measuring device. The valve blocks A and B are of the same general character, each having a passage 10 running across the block and being so positioned that when the blocks are assembled, these passages will be in communication. Leading into a portion of said passages 10, is another passage 11, preferably of elbow shape, communicating with a bushing 12 tapped into the block to tightly position the pipe 13 leading from one of the several tanks. The passages 10 and 11 both communicate with the passage 14 of larger diameter, into which a needle valve 15 extends, which valve is of smaller diameter than the passage 14 but of large enough diameter to close the passage 11 by seating at 24.

The valve 15 is provided with screw threads adapted to be threaded in corresponding threads of the bushing 16 provided in the block, said bushing preferably having the cap 17 threaded thereon and between which cap and bushing there may be provided packing 18, to thereby insure that no leakage will take place around the needle valve. A shouldered head 19 is provided for the needle valve for convenient actuation of the same.

The block A is provided with a passage 20 communicating with the passage 14, the passage 20 being provided at the top thereof with a bushing 21 tightly securing the piping 22 leading to the gauge or measuring device 23 to the block. The blocks B are not provided with this passage 20 as there is no need for it, it being contemplated that only one gauge is to be used. The passages 10 between the blocks are preferably countersunk, as shown at 25, and a rubber packing 26 disposed around the short tube 27 is disposed between the blocks to prevent any leakage.

At the free ends of the assembly, the passages are closed by means of a suitable stopper 28 disposed in the countersunk portion and held in place by the fastening clips 29 provided with the holes 30 for fastening the battery of valves in any convenient position. One leg of this clip has suitable holes provided therein registering with passages in the blocks, through which any suitable fastening means, such as a nut and bolt or threaded rod arrangement 31, is adapted to extend, this leg of the clip providing a bearing surface for tightening the bolts or nuts of this fastening means.

In the modification shown in Figure 4, there is used an assembly of blocks A, in which case, in place of having the bushing 21 in those blocks not attached to the gauge, the threaded aperture 32 of the block A is closed by a correspondingly tapped or threaded plug 33, thus providing a battery of valves similar to that shown in Figure 1, wherein only one gauge is used. It will be noticed that though each or any of the passages 11 are closed by the communicating valve, the passage running the length of the battery of valves is never closed by the needle valves, due to the enlarged portions 14 provided around each needle valve and with which the passages 10 communicate.

It will be seen that the arrangement shown is very desirable because it is only necessary to have in stock one, or at most two kinds of valve blocks, the parts of said blocks being interchangeable so that if there is a failure of any part, it may be readily replaced.

I do not wish to be limited by the modification shown as other and various modifications of the device will of course occur to those skilled in the art.

I claim:

1. In a device of the character described, the combination of a plurality of valve blocks having passages adapted to be aligned for communication, members disposed at either end adapted to close said passages, and means providing a bearing plate for means adapted to fasten said blocks in operative communication.

2. In a device of the character described, the combination of a plurality of valve blocks, passages in said blocks adapted to be aligned for communication, means disposed at the ends of the series of blocks adapted to close the ends of said passages, means providing a bearing surface for fastening means for said series, passages in each block connecting said first named passages to tanks, a measuring device for said tanks connected to said first named passages, and means for controlling fluid flow only into said first named passage.

3. In a device of the character described, the combination of a plurality of similar valve blocks having passages adapted to be aligned for communication when said blocks are assembled, removable means adapted to be positioned in the ends of the assembled passage to thereby close said ends, retaining means for said removable means adapted to be used as a support for the device and a bearing for the fastening means of the device.

4. A valve unit including a valve body, communicating passages therein, one of said passages extending through said body, another of said passages terminating at one end in the through passage, a valve for closing communication between said passages, and a passage communicating with one of said before mentioned passages, communication between this last named passage and the second named passage being controlled by said valve.

5. A valve unit including a valve body, communicating passages therein, one of said passages extending through said body, another of said passages terminating at one end in the through passage, a valve for closing communication between said passages, a passage communicating with one of said before mentioned passages, communication between this last named passage and the second named passage being controlled by said valve, and means for connecting valve units in operative relation with each other.

6. A valve unit including a valve body, communicating passages therein, one of said passages extending through said body, another of said passages terminating at one end in the through passage, a valve for closing communication between said passages, and a passage communicating with one of said before mentioned passages, communication between this last named passage and the second named passage being controlled by said valve, the outer ends of certain of said passages being enlarged for accommodation of body completing members.

Signed at New York city, New York, this 18th day of May, 1927.

JACK D. SARTAKOFF.